United States Patent [19]

Barnard

[11] Patent Number: 5,215,808
[45] Date of Patent: Jun. 1, 1993

[54] OPTICAL TAPE RECORDING MEDIA WITH INTEGRAL DUST-DEFOCUSING TRANSPARENT FILM

[75] Inventor: James A. Barnard, Conesus, N.Y.

[73] Assignee: Eastman Kodak Company, Rochester, N.Y.

[21] Appl. No.: 577,373

[22] Filed: Sep. 4, 1990

[51] Int. Cl.$^5$ .............................................. B32B 23/02
[52] U.S. Cl. ................................... 428/194; 428/178; 428/412; 428/913; 430/945; 346/76 L; 346/135.1
[58] Field of Search ................... 428/64, 65, 694, 900, 428/913, 178, 412; 360/88, 96.1; 365/122, 215; 369/13, 44.23, 275.4, 275.5, 292; 430/945; 346/76 L, 135.1

[56] References Cited

U.S. PATENT DOCUMENTS 5,006,422  4/1991  Sakurai et al. .................. 428/694

Primary Examiner—Paul J. Thibodeau
Assistant Examiner—R. Follett
Attorney, Agent, or Firm—William W. Holloway

[57] ABSTRACT

An optical tape recording medium is provided with a transparent flexible membrane which covers the recording surface of the tape and is bonded to its edges so as to trap a small bubble of fluid, e.g., gas or liquid. During recording, the trapped bubble displaces dust particles resting on the film's upper surface to a location out of the zone of focus of a read/write beam. As the tape is longitudinally transported, the trapped bubble is held stationary at the read/write station of the recording apparatus. In a tape cassette, the optically writable tape is wound around two reels with sufficient tension to trap the bubble in that portion of the tape stretched between the supply and take-up reels. In one embodiment of the invention, the bubble contains a transparent magnetic liquid which can be properly positioned by a magnet when the cassette is first inserted into an optical recording or playback apparatus. The invention is generally useful with any optically writable media, including optical and magneto-optical write/read media.

7 Claims, 5 Drawing Sheets

OPTICAL TAPE RECORDING MEDIA WITH INTEGRAL DUST-DEFOCUSING TRANSPARENT FILM

BACKGROUND OF THE INVENTION

The present invention relates to the field of optical and magneto-optical recording. More particularly, it relates to an improved optical tape recording media in which the adverse effects of dust and other contaminating particles on the media surface are mitigated by an integral transparent film which, during the recording and playback of information on the media, operates to displace such particles from the media surface and thereby render them substantially transparent to the recording/playback beam.

In the optical recording/playback process, bits of binary data are recorded in an optical recording layer as a track of optically detectable micron-sized pits or spots. The recording of such pits and spots is commonly effected by scanning the recording layer with a focused beam of radiation (e.g., that produced by a laser) while intensity-modulating the beam with the binary information. Recovery of the recorded information is achieved by scanning the recording layer with a sharply focused beam of radiation (e.g., produced by a laser) and monitoring the beam for transmission or reflection variations caused by the irradiated pits or spots.

In the magneto-optic recording process, a series of data bits are recorded in a magnetic recording layer as a track of micron-sized, vertically oriented magnetic domains. During recording, the up/down orientation of these domains is changed by scanning the magnetic layer with an intensity-modulated laser beam while subjecting the layer to a magnetic field in a direction perpendicular to the magnetic layer. The beam intensity, at high power, is sufficient to heat the recording layer to a temperature above its Curie point. Detection of the up/down orientation of the previously recorded magnetic domains is detected by scanning the data track with a plain-polarized beam of radiation and monitoring the beam for shifts in the plane of polarization, as occasioned by the Kerr or Faraday effects.

Owing to the relatively minute size of the recorded data on optical and magneto-optical recording elements, it is easy to appreciate that the presence of contamination particles (e.g., dust) on the recording media surface can wreak havoc on the data recording and playback processes. A single dust particle can obliterate many of the recorded pits, spots or domains, rendering the information they represent non-recoverable. Where the recording element is in the form of a disk, the particle contamination problem has been solved by recording and playing back information through a relatively thick (e.g., greater than 500 microns) transparent layer. Such layer usually takes the form of a plastic or glass substrate which supports the recording layer, as disclosed, for example, in U.S. Pat. No. 4,600,682 to F. W. Spong et al. Alternatively, recording and playback are effected through a thin transparent film or membrane which is maintained at a spaced position above the recording layer. Such an approach is disclosed, for example, in the commonly assigned U.S. Pat. No. 4,365,258 to F. F. Geyer et al. Owing to the spacing between the transparent membrane and the recording layer or, in the case of a contiguous transparent layer, the thickness of such layer, dust particles resting on the exposed surfaces of these transparent members are sufficiently spaced from the recording layer (i.e., the intended plane of focus of the read/write beam) as to prevent such particles from obscuring a significant portion of the focused beam. By this arrangement, contamination particles are not "seen" by the read/write optical system.

While the thick transparent substrate and spaced thin transparent membrane approaches to the contamination problem work well when the recording element is in the form of a disk, it may be appreciated that these solutions are disadvantageous when applied to a recording medium in the form of an elongated web or tape. Adding a 500 micron thick dust-defocusing layer to an optical tape would so increase the thickness of the tape as to severely lomit the recording capacity of a spool or reel of practical diameter.

SUMMARY OF THE INVENTION

In view of the foregoing discussion, an object of this invention is to provide an improved optical tape structure in which dust particles on the surface of the tape are prevented from interferring with the reading and writing of information thereon.

In accordance with the present invention, the above object is achieved by the provision of an optical tape having a thin, flexible membrane which is transparent to optical radiation, and is bonded to the tape edges. Such membrane acts to trap a small bubble of fluid, which is transparent to optical radiation, (e.g., a gas such as air) between the membrane and the tape's recording surface. The bubble may be injected between the transparent membrane and the tape recording surface by a syringe, for example, or other suitable means. The bubble is free to move along the length of the tape in a corridor formed by the bonded edges between the tape and membrane. The amount of fluid in the bubble is such that, when the bubble is longitudinally constricted, it covers that area of the tape recording surface irradiated by the read/write beam and displaces that portion of the membrane overlying the tape sufficiently far from the tape's recording surface as to prevent contamination particles from adversely affecting the reading and writing of information in the tape's recording layer.

Preferably, the optical tape is wound around two cassette reels with sufficient tension so that there is no space between the transparent membrane and the tape recording surface except in the portion of the tape between the two reels. Significantly, the thickness of the membrane can be very thin relative to the distance by which the membrane must be displaced from the tape's recording surface in the area of the read/write beam. Therefore, the thickness of the membrane is preferably minimized to minimize the required diameter of the tape cassette reels for a given length of optical recording tape, thereby maximizing the volumetric efficiency of the optical tape. Preferably, the thickness of the flexible membrane may be on the order of approximately 25 microns, while the height by which the bubble displaces the membrane above the tape recording surface may be on the order of between 0.5 and 2 millimeters.

In one embodiment of the invention, the bubble contains a magnetic fluid, which permits a magnet to move the bubble to a desired location in preparation for recording or playback. This is a useful feature in tape machines which withdraw a significant length of tape from the cassette in order to position it with respect to the focused light beam. If the tape is thermo-magneto-optical tape, then the magnet may, if desired, be withdrawn after the bubble has been properly positioned, although this may not always be necessary. Furthermore, a blank leader portion of the tape may be dedicated to this positioning operation. For this purpose, the remainder of the tape is not unwound until the magnet is withdrawn after positioning the bubble, so that the data-bearing portions of the tape will not be affected by the magnet. For write-once magneto-optical tape, the bubble may be removed upon completion of the tape recording process.

In another embodiment of the invention, two light-sensitive recording layers may be used, one recording layer on each side of the supporting base layer, with both surfaces of the planar tape having a bubble trapping membrane.

In yet another embodiment of the invention, a reservoir coupled to one end of the tape replenishes the trapped fluid if it should diffuse through the barrier provided by the tape and bubble trapping membrane.

The fluid may contain an index-matching material to control the index of refraction presented by the bubble.

The comparative advantage of the invention over the prior art may be seen from the fact that conventional dust defocusing techniques cover the recording layer (which is about 25–75 microns thick) with a dust defocusing layer of about 0.5 to 1 millimeter in thickness, increasing the total media thickness by three orders of magnitude (i.e., a factor of $10^3$). While this presents no undue penalties in the case of disk recording, it decreases the volumetric efficiency of optical tape recording by the same factor ($10^3$), which is clearly unacceptable. In contrast, the present invention requires the addition of the bubble trapping membrane, which has approximately the same thickness (25–75 microns) as the original tape media itself. Thus, the invention only doubles the thickness of the tape (which is acceptable), while the prior art techniques would increase it by three orders of magnitude.

The invention and its advantages will be better understood from the ensuing detailed description of preferred embodiments, reference being made to the accompanying drawings.

DETAILED DESCRIPTION OF PREFERRED EMBODIMENTS

Figure 1:
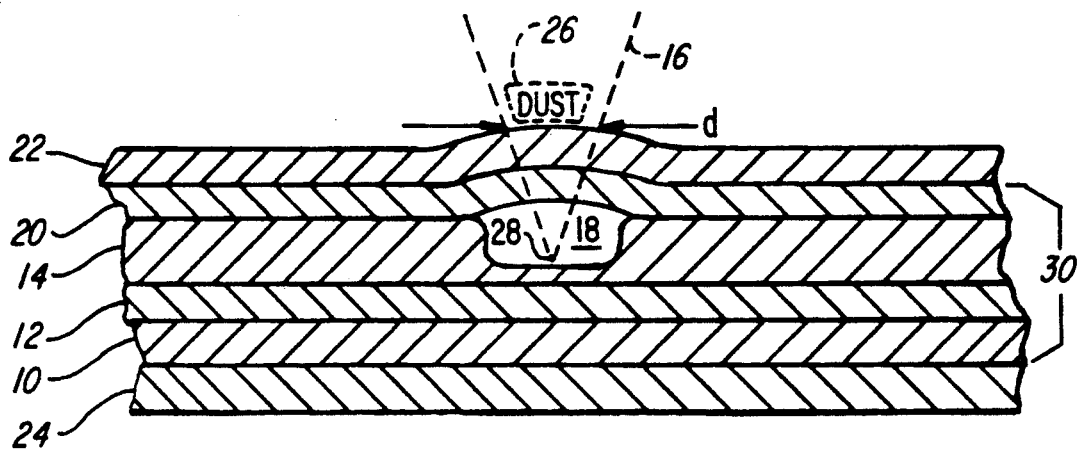
FIG. 1 is a simplified enlarged side cross-sectional view of optical recording tape in accordance with the prior art.

Optical recording tape of the general type sold by Imperial Chemical Industry (ICI) in the United Kingdom, for example, is illustrated in FIG. 1. A thin flexible base substrate 10 of polyester, for example, supports a reflective layer 12 of gold or aluminum. A recording layer 14 overlying the reflective layer 12 comprises an organic dye mixed with an organic binder. A focused laser light beam 16, having a wavelength of 780 or 830 nanometers, for example, ablates a small region of the recording layer, forming a void 18. An encapsulation layer 20 confines within the void 18 the residue products of the reaction between the organic recording layer 14 and the light beam 16 which formed the void 18. (It should be noted that if the recording layer 14 is a magneto-optical material of the type mentioned hereinbelow, then the purpose of the encapsulation layer 20 is to prevent oxidation of the recording layer 14.) The recording layer 14 is typically about 0.1 microns thick. The optical tape web 30 comprising the layers 10, 12, 14 and 20 is in the range of about 25–75 microns thick. An optional polycarbonate hard coat 22 protects the encapsulation and recording layers 20, 14 from contact damage. To reduce friction during transport of the tape, a lubricant film 24 may be applied to the bottom of the base substrate 10.

A dust particle 26 sitting on top of the protective coat 22 blocks most of the light in the beam 16 from reaching the focal point 28 of the beam 18. This is because the top of the protective coat 22 is so close to the focal point 28 that its circular intersection with the cone of the light beam 16 has a diameter d which is not much bigger than the dust particle 26. In the presence of the dust particle 26, the void 18 would not be completely formed as shown, and in fact may not be formed at all, or at least may be too small to be consistently detectable. Conversely, if the void 18 has already been successfully formed, then during playback the dust particle 26 would prevent consistent optical detection of the void 18 in the case where the light beam 16 is used to detect such voids in the recording layer 14. Thus, the data bit represented by the void 18 would be a "drop-out" error in the presence of the dust particle 26.

Figure 2:
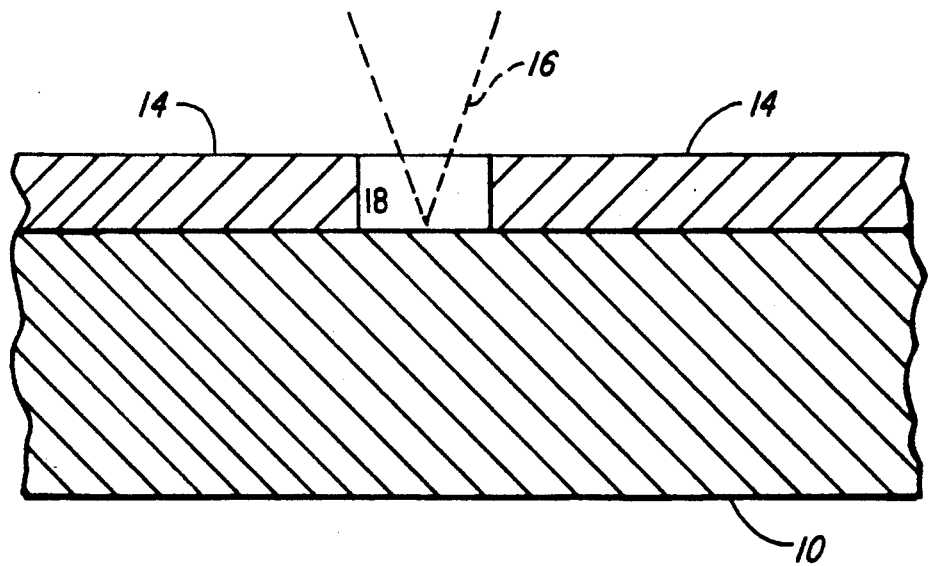
FIG. 2 is a simplified enlarged side cross-sectional view of another optical recording tape according to the prior art.

FIG. 2 illustrates another conventional type of optical tape, in which the recording layer 14 is made of an amorphous/crystalline phase change material which initially is uniformly in one phase (e.g., amorphous). A small region 18 illuminated by the beam 16 undergoes a phase change stimulated by the energy of the beam 16 from the amorphous phase to a crystalline phase (rather than being ablated away, as in FIG. 1). As a result, the region 18 has an index of refraction different from that of the remainder of the recording layer 14, which is detected upon scanning the recording layer 14 with another beam of light.

Another well-known type of material useful in longitudinal optical data recording as the recording layer 14 is film and related photographic media. Such media is of two types, namely conventional film which requires development to manifest the portions exposed to a light beam and another type which requires no post-exposure development. In this case, the exposed portion 18 (FIG. 2), rather than undergoing a phase change, simply undergoes a change in optical characteristics, such as color, opacity or transparency.

Figure 3:
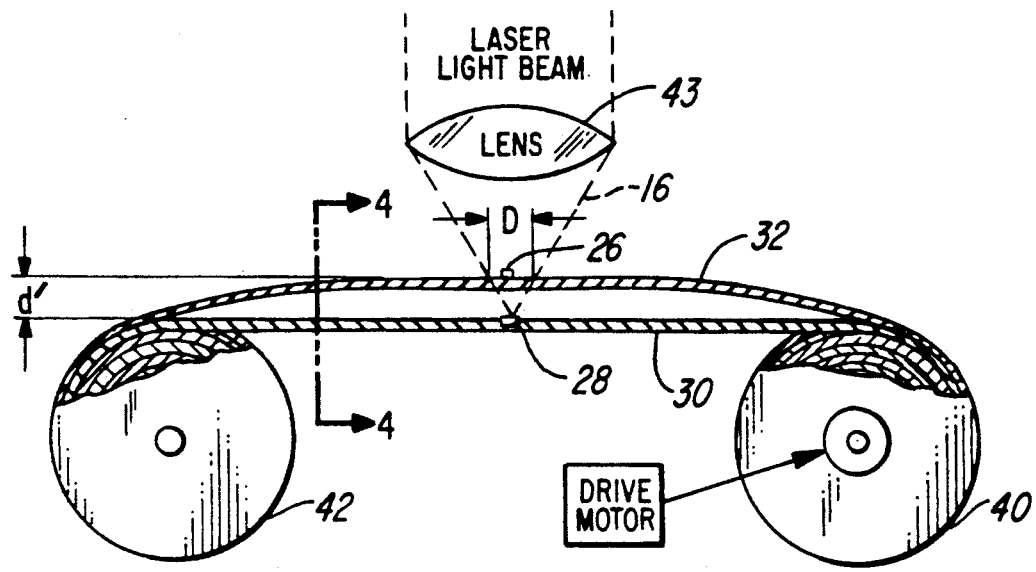
FIG. 3 is a side cross-sectional view of optical tape embodying the invention.
Figure 4:
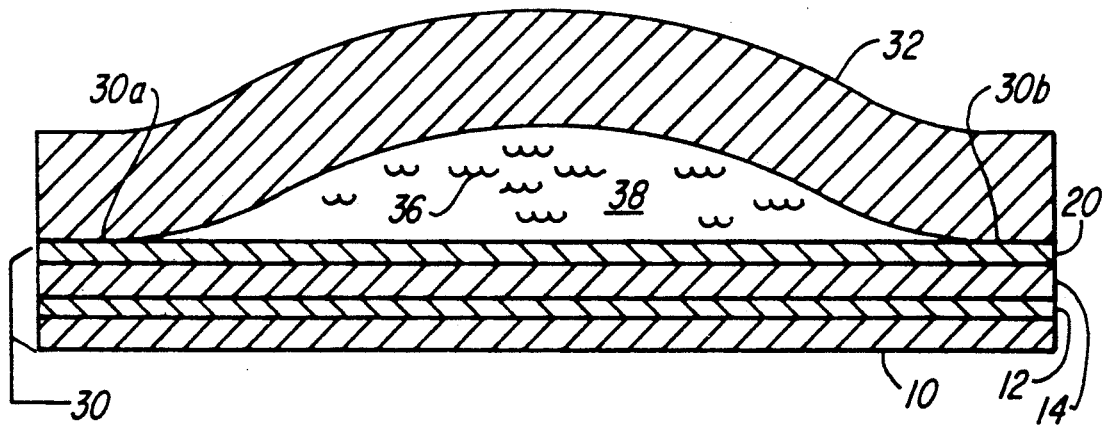
FIG. 4 is an end cross-sectional view of the tape of FIG. 3.
Figure 5:
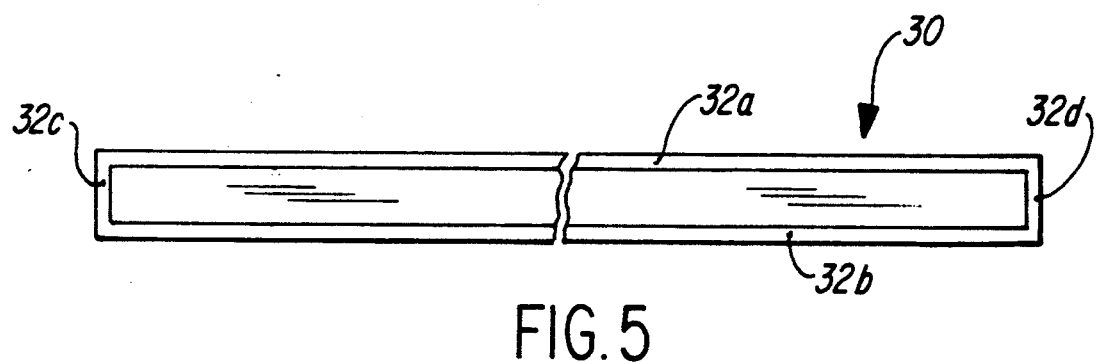
FIG. 5 is a to view of the tape of FIG. 3.

The side cross-sectional view of FIG. 3 illustrates the principle of the present invention, in which the thin flexible optical tape web 30 of FIG. 1 is covered with a thin transparent bubble trapping membrane 32. The bubble trapping membrane 32 may be formed of polycarbonate, for example, and has about the same thickness (25–75 microns) as the optical tape web 30. As shown in the end cross-sectional view of FIG. 4 and in the top view of FIG. 5, the edge peripheries 32a, 32b of membrane 32 are bonded to the longitudinal edge peripheries 30a and 30b of the top surface of the optical tape web 30. As shown in FIG. 5, the end peripheries 32c, 32d of the membrane 32 are similarly bonded to the top surface of the optical tape web 30.

Figure 6:
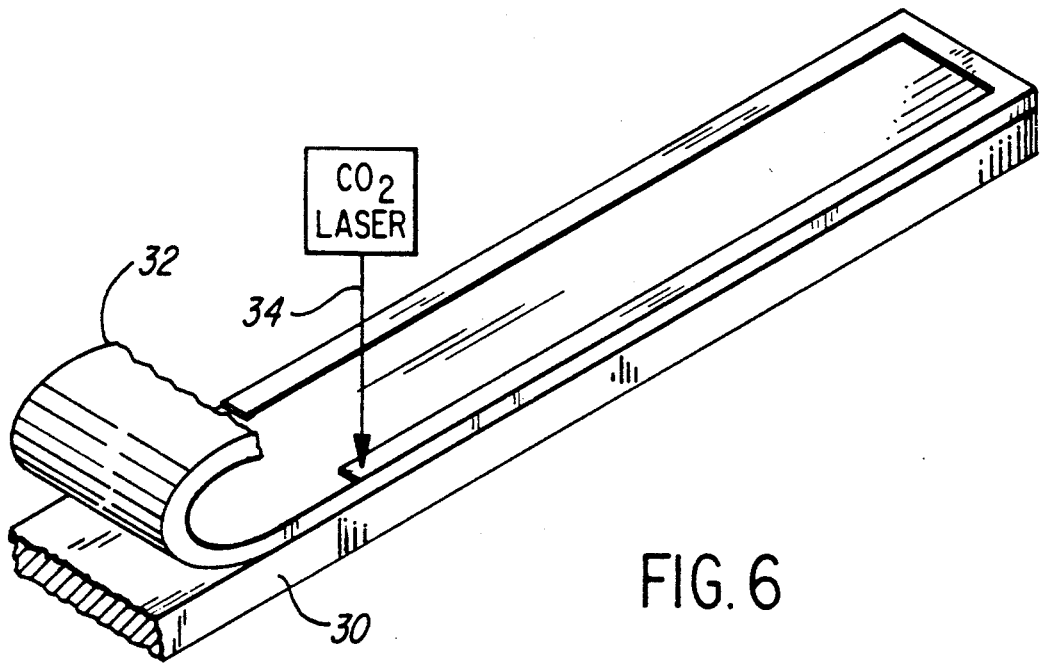
FIG. 6 is a partially cut-away perspective view of the tape of FIG. 3.

Such bonding may be carried out in the manner shown in FIG. 6, in which a light beam 34 from a $CO_2$ laser, for example, heats the peripheries 32a, 32b, 32c, 32d of the membrane 32 as it lays on top of the optical tape web 30.

Referring again to FIG. 4, the transparent membrane 32 may expand upon the injection of a bubble of gas or fluid 36, forming a cavity or corridor 38 confined transversely by the bonded peripheries 32a, 32b of the membrane. Referring to FIG. 3, the cavity 38 is longitudinally confined in the preferred embodiment by winding the tape web 30 around a pair of cassette reels 40, 42 with sufficient tension to press the membrane tightly against the tape web 30 except along that portion of the tape web 32 disposed between the two reels 40, 42.

A focusing lens 43 focuses the read/write beam 16 into a light cone whose apex is the focal point 28, as shown in FIG. 3. The amount of fluid or gas 36 in the bubble trapped in the cavity 38 is sufficient to hold membrane 32 away from the optical tape by a certain distance d', as shown in FIG. 3. The distance d' is so great that the dust particle 26 (which rests on the cover layer 32 in FIG. 3 instead of near the recording layer 14 as in FIG. 1) is in a very wide portion of the cone of the light bean 16 and therefore prevents very little of the light from reaching the focal point 28 in the optical tape web 30 of FIG. 3. If the numerical aperture of the light beam cone is about 0.3–0.7 and the cavity 38 contains air, then the distance d' is about 0.5–2 millimeters. In this case, if the size of the focused spot 28 is about 1 micron, the diameter D (FIG. 3) of the cone of the light beam 16 at the plane intersected by the cover layer 32 would be about 0.75 millimeters, which is much larger than the dust particle 26. The bubble trapped by the cavity 38 is held stationary with respect to the light beam 16 as the optical tape web 30/membrane 32 is longitudinally transported during recording or playback. For this purpose, membrane 32 is sufficiently flexible so that each portion of the membrane can move from being in tight contact with the top surface of the optical tape web 30 (when wrapped around one of the reels 40, 42) to being displaced above it by on the order of 1 millimeter (when located between the reels 40, 42). Thus, each portion of the approximately 25 micron-thick membrane 32 vertically travels about 1 millimeter as the tape web 30 is longitudinally transported by rotating the two reels 40, 42.

Figure 7A:
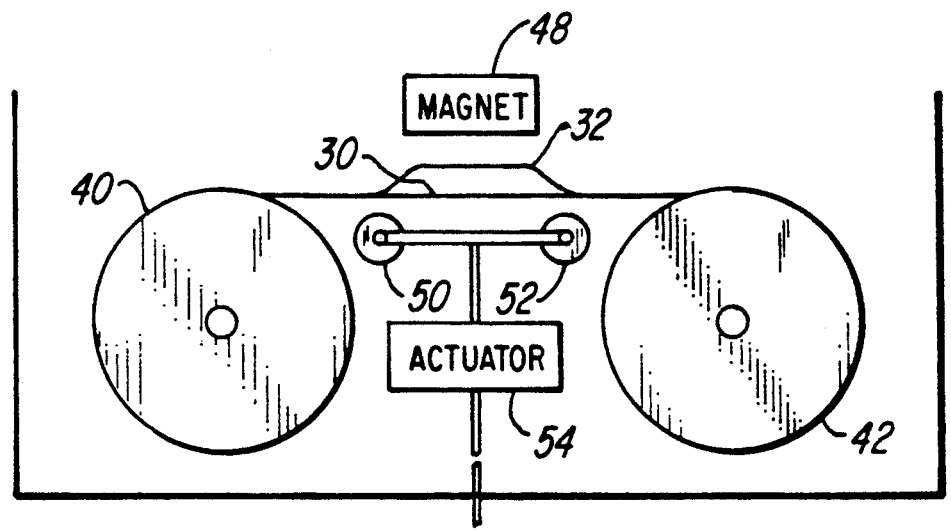
FIGS. 7a and 7b illustrate a method for positioning the bubble in the optical recording tape of FIG. 3.
Figure 7B:
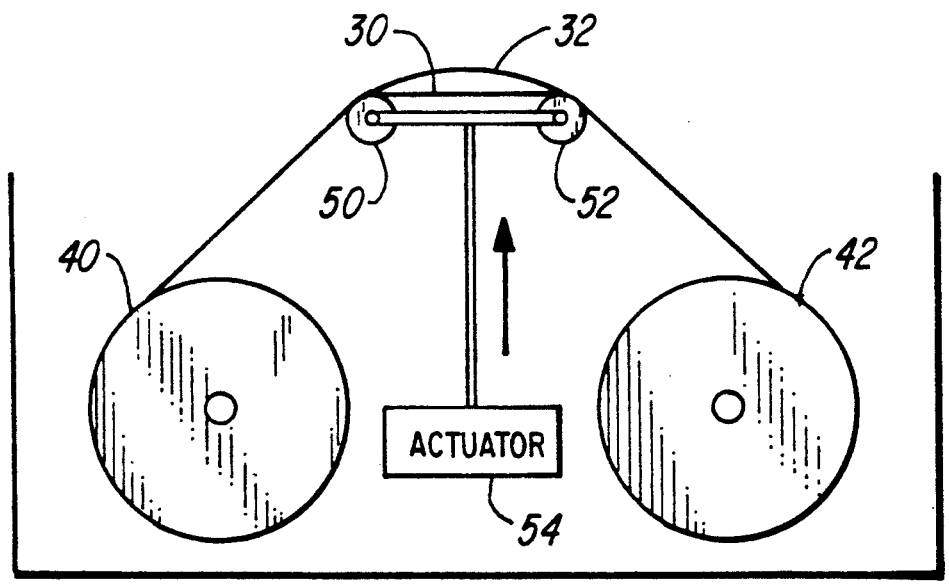

FIGS. 7a and 7b illustrate how a magnet may be used to precisely position cavity 38 in the case where the fluid 36 is magnetic. In FIG. 7a, a magnet is located near the tape web 30 astride two movable capstans 50, 52 controlled by an actuator 54. The magnet 48 is sufficiently strong to pull the magnetic fluid 36 and reduce the longitudinal extent of the cavity 38 (from the dashed line shape to the solid line shape in FIG. 7a), permitting the two capstans 50, 52 to trap the entire bubble. As the actuator 48 pushes the capstans 50, 52 against the tape web 30, the magnet 48 is withdrawn, permitting the capstans to move the tape web 30/membrane 32 to a desired location, as shown in FIG. 7b.

Figure 8:
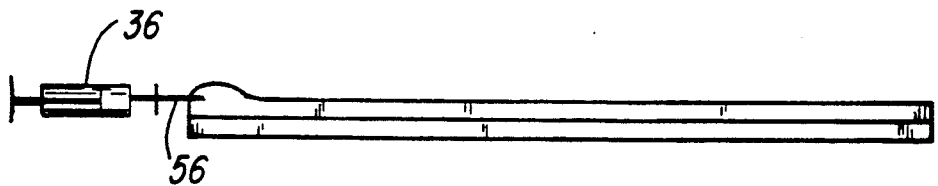
FIG. 8 illustrates an exemplary method of forming the bubble in the optical recording tape of FIG. 3.

FIG. 8 illustrates one method of injecting the fluid or gas 36 between the tape and transparent membrane to form the cavity 38, using a syringe 56 containing the fluid or gas 36. The hole in the membrane 32 formed by the syringe 56 may be self-sealing or may require deposition of a sealant or heat sealing (by a laser beam, for example), depending upon the composition of the membrane 32. As mentioned hereinabove, the membrane 32 is preferably polycarbonate.

Figure 9:
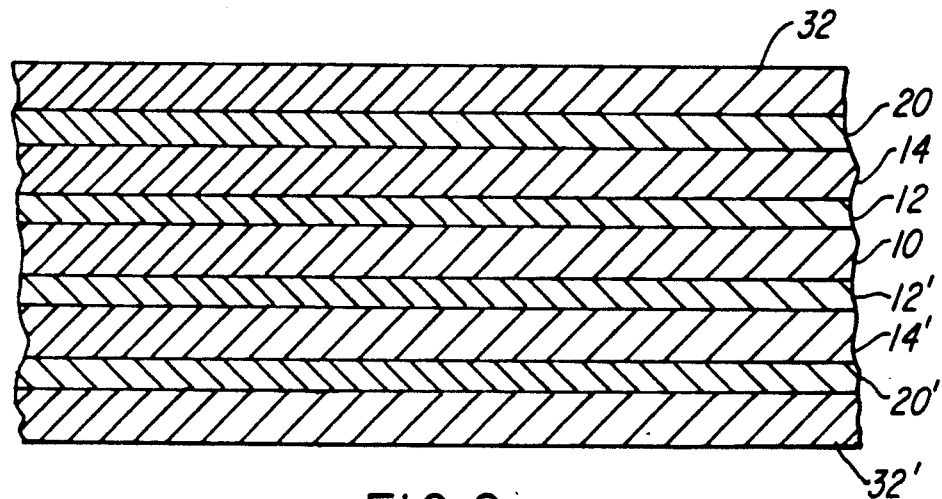
FIG. 9 illustrates an embodiment of the invention suitable for two-sided optical tape recording.

FIG. 9 illustrates an alternative embodiment of the invention, which permits two-sided optical tape recording. Both faces of the planar base substrate 10 support a reflective layer 12 (12'), a recording layer 14 (14'), an encapsulation layer 20 (20') and an overlying bubble trapping dust defocusing membrane 32 (32'), peripherally bonded to the top of the encapsulation layer 20 (20') in the same manner illustrated in FIGS. 4, 5 and 6.

Figure 10:
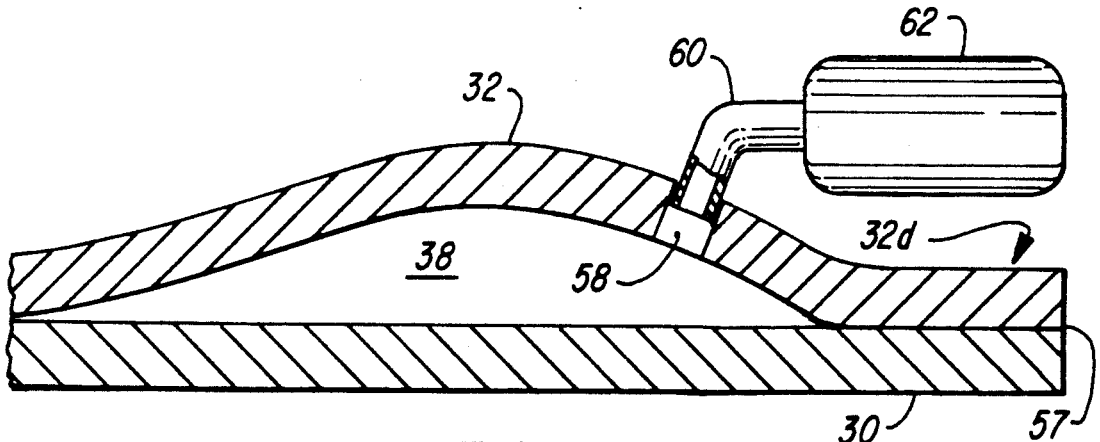
FIG. 10 illustrates how a reservoir of fluid coupled to one end of the optical recording tape of the invention may replenish fluid lost from the bubble through gradual diffusion.

Referring to FIG. 10, in order to replenish fluid lost from the cavity 38, the tape/membrane media 30, 32 is wound until the cavity 38 is located at one terminal end 57 of the media 30, 32 at the sealed membrane periphery 32d. An opening 58 through the membrane 32 permits injection of fluid into the cavity 38 through a very thin pipe 60 from a reservoir 62. The pipe 60 and reservoir 62 may be supported on the tape/membrane media 30, 32 itself, on one of the reels 40, 42 or on a tape recording or playback machine supporting the reels 40, 42.

The invention has been described in detail with particular reference to certain preferred embodiments thereof, but it will be understood that variations and modifications can be effected within the spirit and scope of the invention.

What is claimed is:

1. Optical tape recording media comprising:
   an elongated support having an optical recording layer disposed on a planar surface thereof; and
   a flexible membrane overlaying said recording layer, said membrane being transparent to optical radiation said membrane being bonded to said support along opposing edges to trap a bubble of fluid, which is transparent to optical radiation, between said recording layer and said membrane, said buble being movable along the length of said support by squeezing said membrane and said support together.

2. The optical tape recording media defined by claim 1 wherein said fluid comprises a gas.

3. The optical tape recording media defined by claim 1 wherein said fluid comprises a liquid.

4. The optical tape recording media as defined by claim 3 wherein said liquid comprises a magnetic material, whereby the longitudinal position of said bubble along said support is controllable by a magnetic field.

5. The optical tape recording media as defined by claim 1 wherein said membrane is heat bonded to said support.

6. The optical tape recording media as defined by claim 1 wherein said membrane comprises a polycarbonate film.

7. The optical tape recording media as defined by claim 1 wherein said membrane has a thickness approximately equal to the thickness of said support and said recording layer.

* * * * *